United States Patent
Daley et al.

(10) Patent No.: US 11,954,621 B2
(45) Date of Patent: Apr. 9, 2024

(54) PERSONAL PROTECTIVE EQUIPMENT (PPE) MANAGEMENT

(71) Applicant: International Business Machines Corporation, Armonk, NY (US)

(72) Inventors: Stan Kevin Daley, Espanola, NM (US); Rhonda L. Childress, Austin, TX (US); Jeremy R. Fox, Georgetown, TX (US); Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 17/540,410

(22) Filed: Dec. 2, 2021

(65) Prior Publication Data
US 2023/0177424 A1    Jun. 8, 2023

(51) Int. Cl.
*G06Q 10/06* (2023.01)
*G06Q 10/0631* (2023.01)
*G06V 10/422* (2022.01)
*G06V 20/40* (2022.01)

(52) U.S. Cl.
CPC ..... *G06Q 10/06313* (2013.01); *G06V 10/422* (2022.01); *G06V 20/41* (2022.01)

(58) Field of Classification Search
None
See application file for complete search history.

(56) References Cited

U.S. PATENT DOCUMENTS

| | | |
|---|---|---|
| 2007/0199567 A1 | 8/2007 | Kanzer |
| 2009/0224868 A1 | 9/2009 | Liu |
| 2010/0287561 A1* | 11/2010 | Floyd .......... G06F 9/3851 718/108 |
| 2011/0006894 A1 | 1/2011 | Witwer |
| 2011/0227700 A1 | 9/2011 | Hamerly |

(Continued)

FOREIGN PATENT DOCUMENTS

| | | |
|---|---|---|
| CN | 108885771 A | 11/2018 |
| CN | 109416775 B | 9/2020 |

(Continued)

OTHER PUBLICATIONS

Zehranaz et al. (Fair allocation of personal protective equipment to health centers during early phases of a pandemic, Computers & Operations Research, vol. 141, 2022, ISSN 0305-0548, https://doi.org/10.1016/j.cor.2021.105690.).*

(Continued)

*Primary Examiner* — Matthew D Henry
(74) *Attorney, Agent, or Firm* — James L. Olsen (57) ABSTRACT

Aspects of the present disclosure relate to personal protective equipment (PPE) management. A set of personal protective equipment (PPE) data describing use time limits of respective PPE articles of a set of PPE articles can be received. Use of a PPE article of the set of PPE articles can be monitored using one or more sensors. A determination can be made whether a PPE usage rule of the PPE article is satisfied based on the monitoring, where the PPE usage rule is based on at least a use time limit of the PPE article. A PPE recommendation action can be issued in response to determining that the PPE usage rule of the PPE article is satisfied.

9 Claims, 6 Drawing Sheets

(56) References Cited

U.S. PATENT DOCUMENTS

| | | | |
|---|---|---|---|
| 2016/0019915 A1* | 1/2016 | Khan | G10L 19/018 |
| | | | 704/239 |
| 2017/0372216 A1 | 12/2017 | Awiszus | |
| 2018/0189449 A1 | 7/2018 | Karumba | |
| 2019/0064750 A1 | 2/2019 | Awiszus | |
| 2019/0179286 A1 | 6/2019 | Horseman | |
| 2020/0168069 A1* | 5/2020 | Kanukurthy | A62B 9/006 |
| 2021/0117933 A1* | 4/2021 | Lobner | G06Q 10/063114 |

FOREIGN PATENT DOCUMENTS

| | | |
|---|---|---|
| TW | 351620 U | 3/2009 |
| WO | 2020208504 A1 | 10/2020 |

OTHER PUBLICATIONS

Daley et al., "Determining Risk Mitigation Measures From Assessed Risks", U.S. Appl. No. 17/122,476, filed Dec. 15, 2020, 57 pages.
IBM, "IBM's response to COVID-19 coronavirus", printed Sep. 8, 2021, 10 pages, <https://www.ibm.com/impact/covid-19>.
IBM, "Latest News", IBM Newsroom, printed Sep. 8, 2021, 7 pages, <https://newsroom.ibm.com/>.
Mell et al., "The NIST Definition of Cloud Computing", NIST, National Institute of Standards and Technology, Special Publication 800-145, Sep. 2011, 7 pages.

\* cited by examiner

PERSONAL PROTECTIVE EQUIPMENT (PPE) MANAGEMENT

BACKGROUND

The present disclosure relates generally to the field of computing, and in particular, to personal protective equipment (PPE) management.

Personal protective equipment (PPE) is designed to protect individuals from potential injury or danger. PPE can include articles such as goggles, clothing, masks, helmets, and shoes. Hazards that can be addressed by PPE include physical, electrical, heat, chemicals, biohazards, and airborne particulate matter, among others.

SUMMARY

Embodiments of the present disclosure are directed to a method, system, and computer program product for personal protective equipment (PPE) management. A set of personal protective equipment (PPE) data describing use time limits of respective PPE articles of a set of PPE articles can be received. Use of a PPE article of the set of PPE articles can be monitored using one or more sensors. A determination can be made whether a PPE usage rule of the PPE article is satisfied based on the monitoring, where the PPE usage rule is based on at least a use time limit of the PPE article. A PPE recommendation action can be issued in response to determining that the PPE usage rule of the PPE article is satisfied.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to computing, and in particular, to personal protective equipment (PPE) management. While the present disclosure is not necessarily limited to such applications, various aspects of the disclosure can be appreciated through a discussion of various examples using this context.

Personal protective equipment (PPE) is designed to protect individuals from potential injury or danger. PPE can include articles such as goggles, masks, clothing, helmets, and shoes. Hazards that can be addressed by PPE include physical, electrical, heat, chemicals, biohazards, and airborne particulate matter, among others.

PPE usefulness depends on whether it is properly used (e.g., properly worn) and timely disposed of (e.g., within a time limit that the PPE is rated for). The time limit that a PPE article can be used depends not only on the individual characteristics of that PPE (e.g., the manufacturer's recommended use time and material), but also the environment the PPE has been exposed to (e.g., whether the PPE has become wet, whether the PPE is to be replaced after a particular event, whether the PPE has been compromised due to exposure/impact, etc.).

Though there are protocols (e.g., occupational safety and health administration (OSHA) standards) that hospitals, laboratories, construction contractors, and other entities abide by when using/managing PPE, non-compliance is a common occurrence. Further, pre-defined protocols may not take into consideration various events and/or timings in which PPE should ideally be replaced. A solution is needed to monitor PPE use over time such that recommendations can be made for properly managing (e.g., replacing, repairing, disinfecting, discarding, etc.) PPE.

Aspects of the present disclosure relate to personal protective equipment (PPE) management. A set of personal protective equipment (PPE) data describing use time limits of respective PPE articles of a set of PPE articles can be received. Use of a PPE article of the set of PPE articles can be monitored using one or more sensors. A determination can be made whether a PPE usage rule of the PPE article is satisfied based on the monitoring, where the PPE usage rule is based on at least the use time limit of the PPE article. A PPE recommendation action can be issued in response to determining that the PPE usage rule of the PPE article is satisfied.

By issuing recommendations based on observed conditions (e.g., current use times, sensor data, location data, etc.), PPE can be repaired/replaced in situations where it may have been conventionally overlooked. More conditions in which PPE should be replaced can be captured and conveyed to users to prevent injury or danger of the user, improve workplace efficiency, and prevent workplace errors. Thus, aspects of the present disclosure improve usability and safety of PPE use within various environments.

Figure 1:
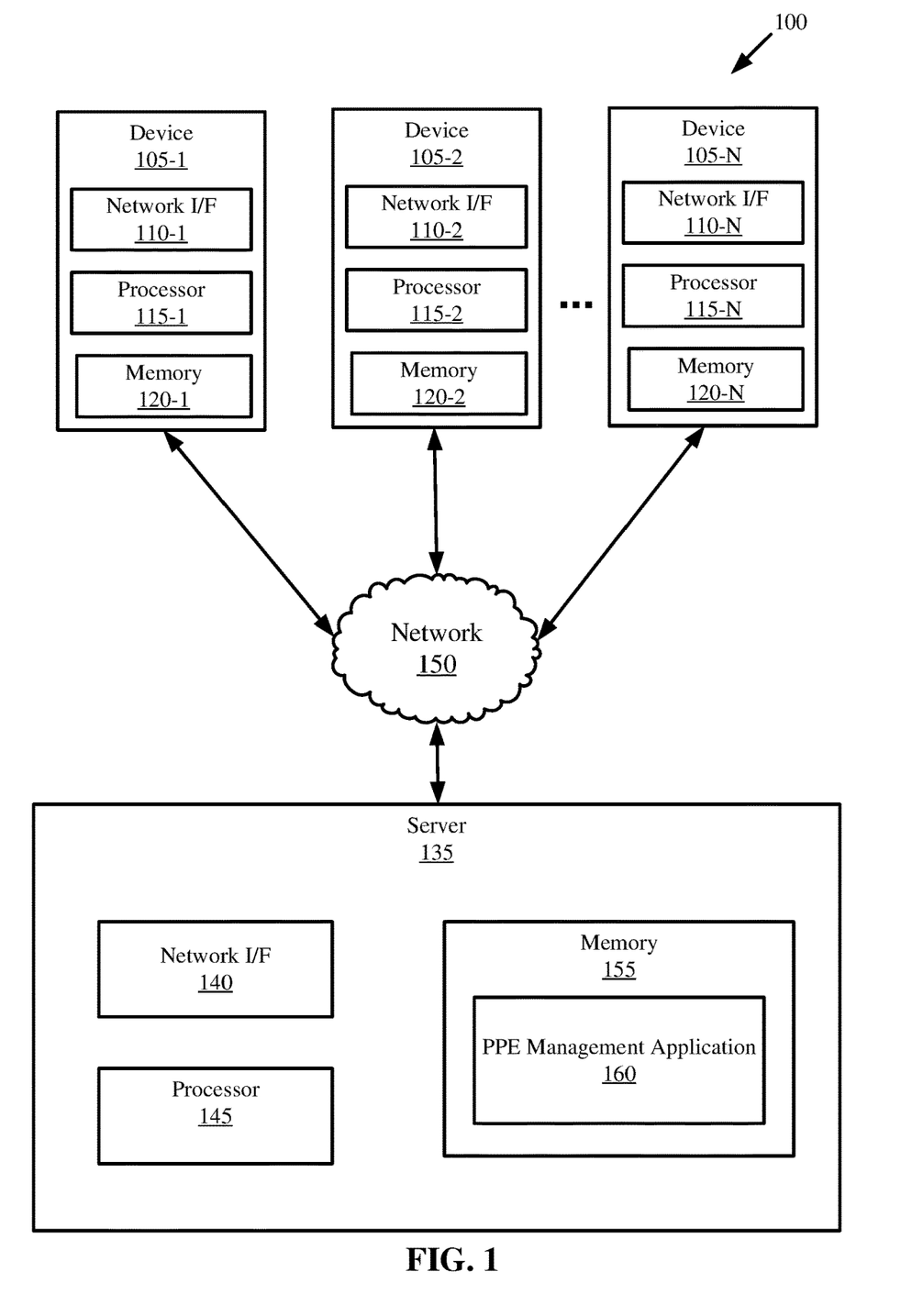
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . .

120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., virtual reality software, browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes a personal protective equipment (PPE) management application 160. The PPE management application 160 can be configured to monitor PPE usage over time and issue PPE recommendation actions in response to observed conditions (e.g., observed events, timings, sensor values, etc.).

The PPE management application 160 can be configured to receive PPE data describing registered PPE equipment used by one or more users. The PPE data can describe product information (e.g., type of PPE, manufacturer, product material, etc.), use limits (e.g., 4 hours, 1 year, etc.), and current use time. In embodiments, all PPE owned by a given entity (e.g., a company or organization) can be pre-registered with the PPE management application 160 and an inventory (e.g., a count with associated product information, use limits, and use times) can be maintained. In some embodiments, upon each use of a new PPE article, the new PPE article can be registered into the PPE management application 160 (e.g., by a user).

The PPE management application 160 can further be configured to receive sensor data of sensors configured to monitor PPE usage over time. Various sensors can be configured to monitor PPE usage over time. For example, sensors that can be configured to monitor PPE usage include audio/video (A/V) sensors (e.g., cameras and microphones), biometric sensors, location sensors (e.g., global positioning system (GPS) sensors), and integrated PPE sensors (e.g., sensors coupled to PPE equipment configured to measure characteristics of the PPE, such as chemical sensors, moisture sensors, clocks, temperature sensors, pressure sensors, etc.), among others.

The PPE management application 160 can be configured to receive/define one or more PPE usage rules defining conditions in which PPE recommendation actions (e.g., to replace, dispose, and/or disinfect in-use PPE) are to be issued. The rules can be based on PPE use time limits (e.g., time limits in which PPE articles are to be replaced as compared to current use time) and observed conditions (e.g., a sensor value exceeds a sensor value threshold, a location of the PPE changes, a camera detects the PPE is entering a new operating room, etc.). The rules can specify the type of PPE recommendation actions (e.g., dispose PPE, replace PPE, disinfect/wash PPE, etc.) to issue in response to observed conditions. In embodiments, PPE usage rules can be updated over time. In embodiments, PPE usage rules can be defined/modified using machine learning (ML) and artificial intelligence (AI) algorithms.

The PPE management application 160 can be configured to monitor PPE use over time as collected by sensors. The PPE management application 160 can be configured to determine (e.g., by analyzing the sensor data) whether a PPE usage rule is triggered. If a determination is made that a PPE usage rule is triggered, the PPE management application 160 can be configured to issue a PPE recommendation action based on the rule. The PPE management application 160 can be configured to continuously monitor PPE sensor data until a PPE usage rule is triggered. In embodiments, the PPE management application 160 can monitor PPE recommendation actions to ensure that PPE actions are followed by one or more users.

In embodiments, machine learning (ML) and artificial intelligence (AI) techniques can be used by the PPE management application 160 to determine and/or modify PPE usage rules. ML and AI algorithms that can be used to aid in defining PPE usage rules include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the PPE management system 160 (e.g., PPE data, sensor data, etc.) can be analyzed or utilized as training data using any of the aforementioned machine learning algorithms.

More specifically, the ML and AI algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other ML and AI techniques.

Though this disclosure pertains to the collection of personal data (e.g., sensor data of users and associated PPE), it is noted that in embodiments, users opt-in to the system (e.g., the PPE management system 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
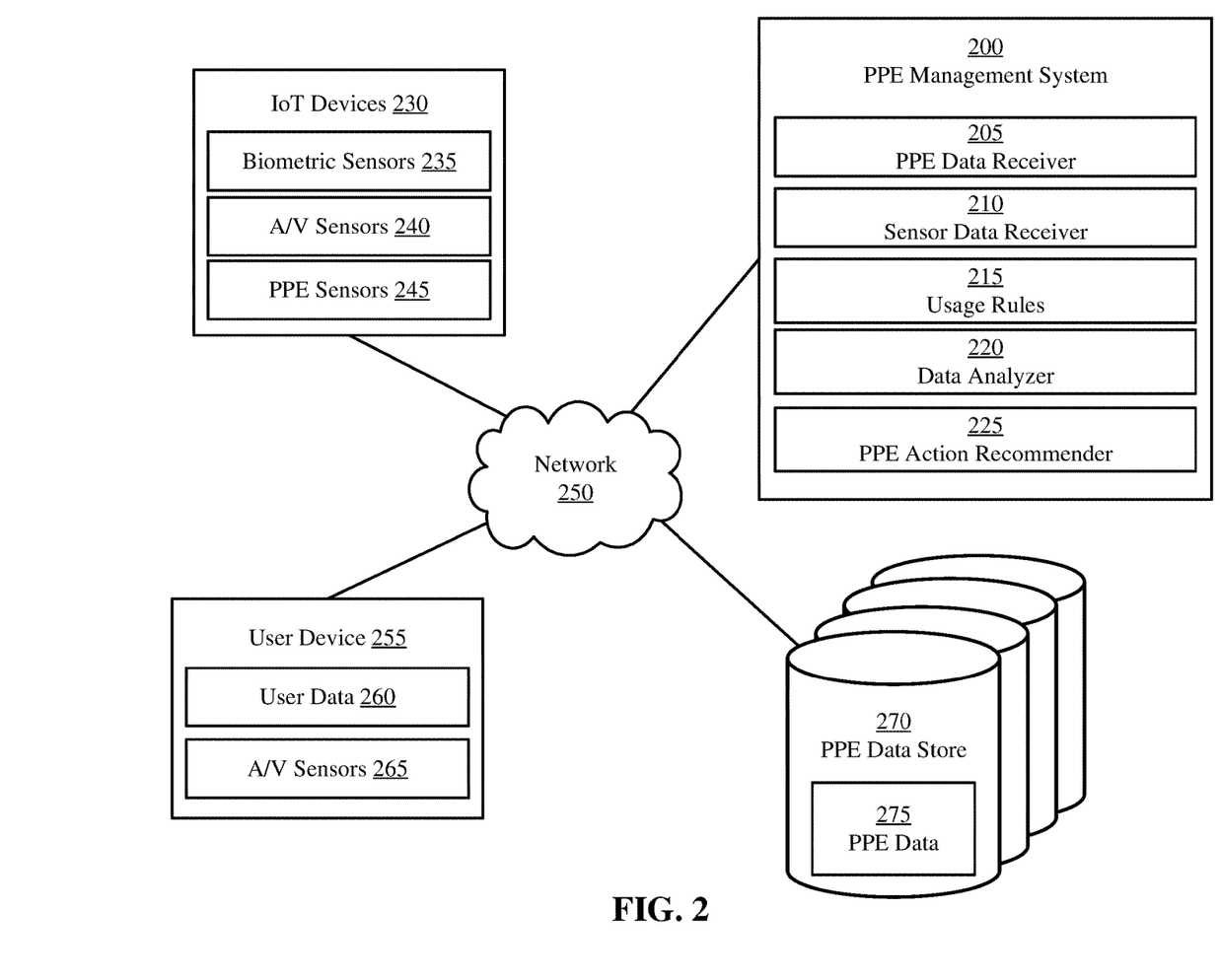
FIG. 2 is a block diagram illustrating an IoT environment, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250, such as, but not limited to, a PPE management system 200, IoT devices 230, a user device 255, and a PPE data store 270. The various components within the IoT environment can be processor executable instructions that can be executed by a dedicated or shared processor using received inputs.

The PPE management system 200 can be configured to receive sensor data to monitor PPE usage over time and issue PPE recommendation actions based on an analysis of the sensor data as compared to PPE usage rules 215. The PPE management system 200 includes a PPE data receiver 205, a sensor data receiver 210, usage rules 215, a data analyzer 220, and a PPE action recommender 225. The PPE data receiver 205, sensor data receiver 210, usage rules 215, data analyzer 220, and PPE action recommender 225 can be processor executable instructions that can be executed by a dedicated or shared process using received inputs.

The PPE data receiver 205 can be configured to receive data describing PPE articles (e.g., PPE data) that may be used by a user and managed by the PPE management system 200. In embodiments, the PPE data receiver 205 can access the PPE data store 270 containing PPE data 275 of registered (e.g., by one or more users) PPE items. The PPE data 275 can include, but is not limited to, PPE product information such as PPE type (e.g., gloves, mask, gown, helmet, shoe covers, etc.), manufacturer information, and PPE material (e.g., latex, rubber, cloth, plastic, etc.). The PPE data 275 can further include a use time limit of each PPE article (e.g., a time limit in which PPE should be replaced/discarded/disinfected) and a current use time (e.g., the amount of lapsed time the PPE has been in use by a user) of each PPE article. In embodiments, the PPE data 275 may be organized into a table or other data structure storing descriptive information of each PPE article. PPE data 275 such as PPE use limits and current use times can be incorporated into usage rules 215 for issuing PPE recommendation actions by the PPE management system 200.

The sensor data receiver 210 of the PPE management system can be configured to receive sensor data from IoT devices 230 and/or user device 255. The sensor data can be used to determine whether any usage rules 215 have been triggered leading to one or more PPE recommendation actions. Any suitable sensor data can be obtained, collected, or otherwise received by the sensor data receiver 210. Sensor data can include, but is not limited to, biometric data obtained from biometric sensors 235 (e.g., heart rate readings, blood glucose levels, body temperature, etc.), audio/video data obtained from A/V sensors 240 and/or 265, and sensor data received from PPE sensors 245. In embodiments, PPE sensors 245 can include sensors coupled to (e.g., physically) PPE articles which track characteristics of the PPE. PPE sensors 245 can include, but are not limited to, chemical sensors (e.g., indicating particular chemical species the PPE has been exposed to), biochemical sensors (e.g., pathogen sensors), moisture sensors (e.g., indicating whether PPE has been exposed to moisture), temperature sensors (e.g., indicating whether PPE has been exposed to temperatures which compromises the PPE), pressure sensors, light sensors (e.g., ultra-violet light sensors), sound sensors, location sensors (e.g., GPS sensors) and others. The sensor data received by the sensor data receiver 210 can be used to determine whether any usage rules 215 based on the sensor data have been triggered (e.g., a condition has been met) leading to a PPE action recommendation.

As discussed above, one or more usage rules 215 can be set for each PPE article such that each PPE article can be managed by the PPE management system. The usage rules 215 can be defined by a user and/or automatically set the PPE management system 200.

In embodiments, the usage rules 215 can be based on time use limits of PPE articles. In these embodiments, usage rules can dictate that upon reaching a particular use time limit (e.g., a time threshold), a particular PPE recommendation action should be issued. Thus, aspects of the present disclosure recognize that a use time limit of PPE can be obtained and compared to a current use time of PPE determine whether to issue a PPE recommendation action within usage rules 215. In embodiments, the current use time of the PPE can be tracked using a clock and/or other sensors configured to track time (e.g., a video camera with time-stamps).

In embodiments, a time that a user will be required to wear PPE in the future can be determined and compared to the current use time of the PPE and the use time limit of the PPE to determine whether to issue a PPE recommendation action as set forth in usage rules 215. For example, assume a user is required to wear a mask in a given room (e.g., an operating room) for the next four hours as set forth in a user schedule (e.g., within user data 260 of user device 255). However, assume that the current use time of the mask is two hours, and the recommended use time for the mask is five hours. In this example, because the user will exceed the five hour use time limit within the room (e.g., the user only has three hours of time left according to the use time limit, but is required to wear a mask for the next four hours), usage rules 215 can dictate that a PPE recommendation action should be issued to recommend replacing the mask before starting the four hour duration session within the room. Thus, aspects of the present disclosure recognize that a time that a user will be required to wear PPE in the future can be determined (e.g., based on user data 260, such as calendar data/scheduling data) and compared to a current use time of the PPE and a use limit of the PPE to determine whether to issue a PPE recommendation action according to usage rules 215.

In some embodiments, the usage rules 215 can be based on sensor values (e.g., of biometric sensors 235, A/V sensors 240 and 265, and/or PPE sensors 245) as compared to one or more sensor thresholds. In these embodiments, if a particular sensor value (e.g., captured by a PPE sensor 245) exceeds a sensor value threshold, then usage rules 215 can dictate that a particular PPE action recommendation should be issued. Sensor data that can be integrated into usage rules includes, but is not limited to, chemical species readings (e.g., air pollution levels), biochemical species readings (e.g., viral load), thermal readings (e.g., temperature levels), pressure readings (e.g., pounds per square inch (psi)), biometric value readings (e.g., heart rate/blood glucose readings), location measurements (e.g., GPS measurements), and moisture readings (e.g., relative humidity). Thus, aspects of the present disclosure recognize that one or more sensor values associated with PPE can be obtained and compared to a sensor value threshold to determine whether to issue a PPE recommendation action within usage rules 215. In embodiments, rates of change of sensor values can be compared to one or more rate of change thresholds within usage rules to determine whether to issue PPE recommendation actions.

In embodiments, conditions captured a microphone of A/V sensors 240 and/or 265 can be used to determine whether to issue PPE recommendation actions within usage rules 215. For example, the recognition of a particular uttered phrase (e.g., "my mask is torn") can lead to a particular issued PPE recommendation action within usage rules 215. In embodiments, a set of keywords can be defined as conditions for issuing PPE recommendation actions within usage rules 215. In these embodiments, if any keywords are detected by a microphone of A/V sensor 240 and/or 265, then a corresponding PPE recommendation action can be issued. In embodiments, a detected sentiment from recognized speech (e.g., using a tone analyzer, such as WATSON™ Tone Analyzer) can lead to a particular PPE recommendation action being issued. However, any suitable PPE usage rules 215 can be defined based on audio data.

In embodiments, conditions captured by a camera (e.g., a video camera) of A/V sensors 240 and/or 265 can be used to determine whether to issue PPE recommendation actions within usage rules 215. In some embodiments, identification of a recognized object (e.g., recognized using a region-based convolutional neural network or other image recognition algorithm) within an image (e.g., a frame of a video) can lead to a particular PPE recommendation action being issued as defined within usage rules 215. In some embodiments, the recognition of a particular event (e.g., an accident occurs, a new patient enters an operating room, etc.) can lead to a particular PPE recommendation action being issued as defined within usage rules 215. In some embodiments, recognition of a particular sentiment within an image (e.g., based on image sentiment image analysis) can lead to a particular PPE recommendation action being issued as defined within usage rules 215. However, any suitable PPE usage rules 215 can be defined based on image data.

In embodiments, location data can be used to issue PPE recommendation actions within usage rules 215. For example, in response to a particular location of a PPE item (e.g., determined via indoor positioning system (IPS) technology and/or global positioning system (GPS) technology) leaving a given boundary (e.g., a work site) or entering a given boundary (e.g., a new operating room), a corresponding PPE recommendation action can be issued based on usage rules 215. Any suitable usage rules 215 can be set based on tracked locations of PPE items.

In embodiments, usage rules 215 can specify that multiple factors can be simultaneously considered when determining whether to issue PPE action recommendations. That is, factors such as PPE sensor data, image data, audio data, location data, and/or use time data can be simultaneously considered when determining whether to issue PPE recommendation actions. In some embodiments, a PPE action recommendation score can be calculated based on a plurality of weighted factors and compared to a threshold to determine whether to issue a PPE recommendation action. The score can be calculated according to a formula PPE Action Recommendation Score=$factor_1 \times weight_1 + factor_2 \times weight_2 \ldots + factor_n \times weight_n$. The PPE action recommendation score can then be compared to one or more thresholds to determine whether to issue a PPE recommendation action.

Values for factors (e.g., $factor_1$-$factor_n$) can be assigned/determined in any suitable manner. For example, if use time compared to a use time limit is taken into consideration as a factor for issuing a PPE recommendation action, a value of "1" can be assigned if the current use time exceeds a use time limit, and a value of "0" can be assigned if a current use time falls below a use time limit. As another example, if object recognition of an analyzed image is taken into consideration as a factor, a value of "1" can be assigned if a particular object is recognized, and a value of "0" can be assigned if a particular object is not recognized. As another example, if a PPE-integrated sensor value is taken into consideration as a factor for issuing a PPE recommendation action, a value of "1" can be assigned at a first sensor value range (e.g., 90-100), a value of "0.75" can be assigned at a second sensor value range (e.g., 80-90), a value of "0.50" can be assigned at a third sensor value range (e.g., 70-80), etc.

Weights (e.g., $weight_1$-$weight_n$) assigned to factors can similarly be assigned/determined in any suitable manner. In embodiments, factors most likely to be important for issuing PPE recommendation actions can be weighted higher, whereas factors least likely to be important issuing PPE recommendation actions can be weighted lower. For example, following the example above, the use time factor could have a weight of 0.75, the object recognition factor could have a weight of 0.10, and the PPE-integrated sensor factor could have a weight of 0.15. However, any suitable weights can be assigned to factors.

Following the example above, if the current use time is determined to not exceed the use time limit, an object recognition match is found, and a PPE-integrated sensor value is determined to be 95, the selection score can be calculated as $(0 \times 0.75)+(1 \times 0.10)+(1 \times 0.15)=0.25$. In this example, if a threshold was defined as 0.60 such that any selection score exceeding 0.60 leads to a particular PPE recommendation action being issued, then the PPE recommendation action would not be issued as the PPE action recommendation score of 0.25 falls below the threshold of 0.60. Though reference is made to example calculations, any suitable values can be substituted for those shown without departing from the spirit and scope of the present disclosure.

Data analyzer 220 can analyze PPE data 275 and/or sensor data (e.g., received from IoT devices 230 and/or user device 255) as compared to usage rules 215 to determine whether any conditions for issuing recommendations by the PPE action recommender 225 have been met (e.g., satisfied). For example, usage rules 215 can include any of the example rules described above based on any suitable data (e.g., current use time, sensor data, A/V data, location data, etc.). Based on a comparison between current conditions and defined usage rules 215, data analyzer 220 can determine whether a usage rule 215 is met.

In response to determining that a usage rule 215 is met, the data analyzer 220 can be configured to transmit a signal to the PPE action recommender 225 to issue a corresponding PPE recommendation action based on the satisfied (e.g., triggered) usage rule 215. The recommendation actions issued by the PPE action recommender 225 can vary, and may be based on the specific usage rule 215 triggered and/or based on the type of PPE used. For example, PPE recommendation actions can include discarding and replacing PPE, repairing PPE, washing/disinfecting PPE, and others. As an example, if an isolation gown comes into contact with a given chemical based on PPE-integrated sensor data, analyzed image data, and/or analyzed audio data, then the PPE recommendation action can be to wash/disinfect the gown. As another example, if a mask PPE article is torn as indicated by analyzed image data, then the PPE recommendation action can be to replace the mask. Any suitable PPE recommendation actions can be issued based on defined usage rules 215.

In embodiments, machine learning techniques can be used to identify usage rules 215 that were effective at matching a user's intentions. For example, a machine learning algorithm can ingest PPE recommendation actions for a given user and fine-tune the usage rules 215 to better match the user's intentions (e.g., based on their perceived sentiment) in the future.

In embodiments, user feedback can be requested after a PPE recommendation action is issued to gauge whether the user was satisfied or dissatisfied with the determination. This can be used to adjust usage rules 215 (e.g., by providing reward/punishment to a supervised reinforcement machine learning algorithm) for PPE recommendation actions. For example, if a user is satisfied with a given PPE recommendation action, then positive feedback can be issued. If a user is dissatisfied with a given PPE recommendation action, then negative feedback can be issued. Thereafter, one or more thresholds and/or rules for issuing PPE recommendation actions can be adjusted based on the received user feedback.

It is noted that FIG. 2 is intended to depict the representative major components of example computing environment. In some embodiments, however, individual components can have greater or lesser complexity than as represented in FIG. 2, components other than or in addition to those shown in FIG. 2 can be present, and the number, type, and configuration of such components can vary.

Figure 3:
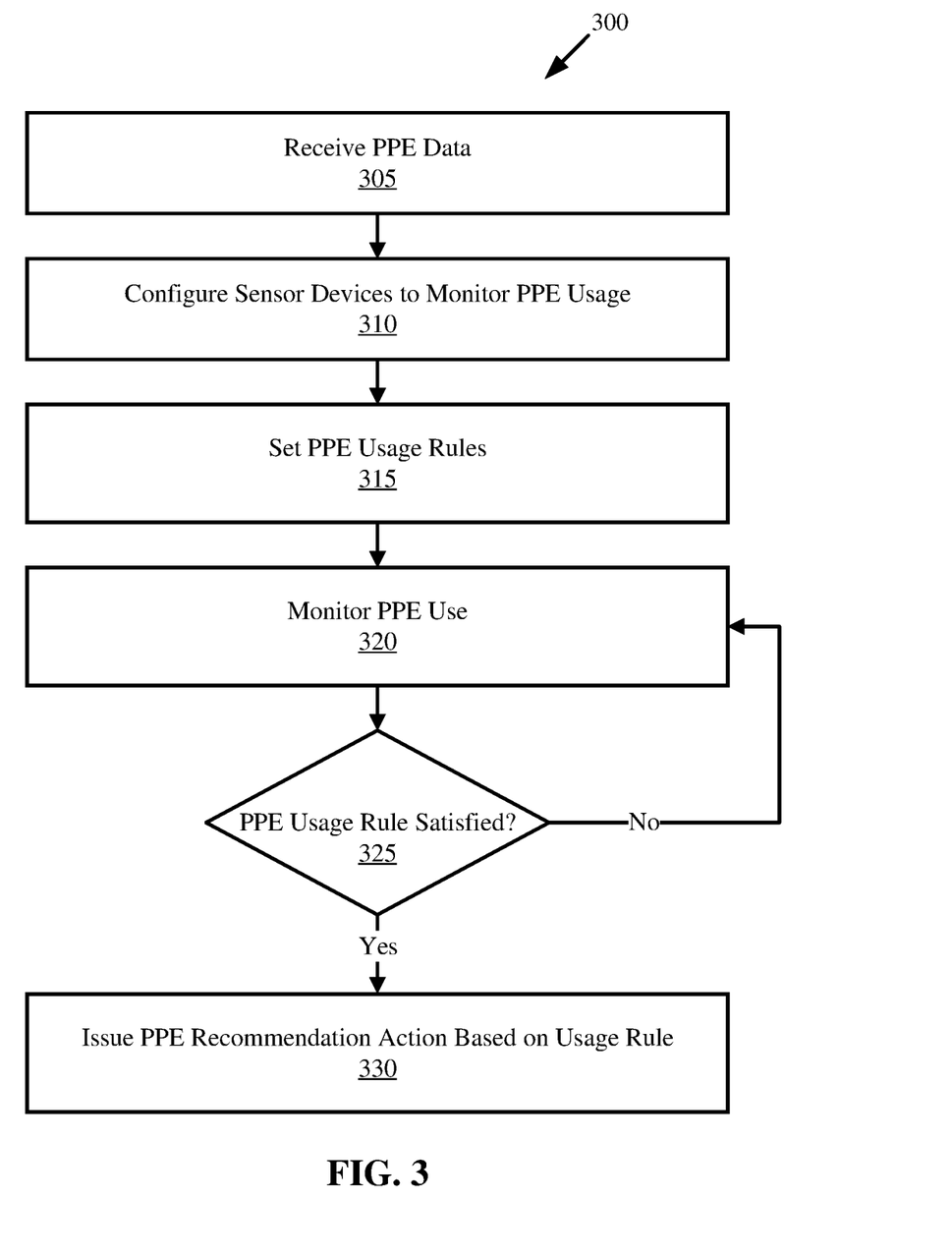
FIG. 3 is a flow-diagram illustrating an example method for personal protective equipment (PPE) management, in accordance with embodiments of the present disclosure.

Referring now to FIG. 3, shown is a flow-diagram illustrating an example method 300 for PPE management, in accordance with embodiments of the present disclosure. One or more operations of method 300 can be completed by one or more computing devices (e.g., devices 105, server 135, IoT devices 230, PPE management system 200, user device 255, computer system 401).

Method 300 initiates at operation 305, where PPE data is received. The PPE data can include PPE data 275 described with respect to FIG. 2. For example, PPE data can include use time limits, current use times, and descriptive information (e.g., manufacturer, material, type) of respective PPE articles. In embodiments, the PPE data can be received as registered by one or more users. In embodiments, the PPE data can be organized in a table or other data structure.

Sensors configured to monitor PPE usage over time can then be configured. This is illustrated at operation 310. The sensors configured to monitor PPE usage can include the sensors discussed with respect to FIGS. 1-2. For example, sensors configured to monitor PPE usage can include A/V sensors, biometric sensors, PPE-integrated sensors, location sensors, clocks, and other sensors.

PPE usage rules are then defined. This is illustrated at operation 315. The PPE usage rules can be the same, or substantially similar to, PPE usage rules 215 described with respect to FIG. 2. The PPE usage rules can be manually and/or automatically defined based on PPE data and/or sensor data. In embodiments, the usage rules can be updated over time (e.g., based on received feedback) using ML and AI algorithms. The PPE usage rules can be based on PPE use time limits, sensor values, audio data, image data, and/or location data.

The PPE use is then monitored. This is illustrated at operation 320. Monitoring PPE usage can include receiving sensor data (e.g., image data, audio data, PPE-integrated sensor data, location data, etc.) over time from configured sensors. A determination is then made whether a PPE usage rule is satisfied (e.g., triggered). This is illustrated at operation 325. Determining whether a PPE usage rule is satisfied can be completed by analyzing the current conditions (e.g., the monitored sensor data) as compared to stored usage rules.

If a determination is made that a PPE usage rule is not satisfied, then PPE usage can be continued to be monitored until a PPE usage rule is determined to be satisfied (e.g., method 300 returns to operation 320). If a determination is made that a PPE usage rule is satisfied, then a PPE recommendation action can be issued based on the usage rule. This is illustrated at operation 330. The PPE recommendation actions can be the same, or substantially similar to, the PPE recommendation actions discussed with respect to the PPE action recommender 225 of FIG. 3. For example, PPE recommendation actions issued based on usage rules can include discarding/replacing PPE, washing/disinfecting PPE, repairing PPE, and others.

In embodiments, though not shown, the user can be monitored (e.g., using sensors configured at operation 310) to determine whether they are complying with the issued PPE recommendation action. If the user is determined to not be complying with the PPE recommendation action, additional PPE recommendations can be issued and/or escalated to additional users (e.g., managers, administrators, etc.).

The aforementioned operations can be completed in any order and are not limited to those described. Additionally, some, all, or none of the aforementioned operations can be completed, while still remaining within the spirit and scope of the present disclosure.

Figure 4:
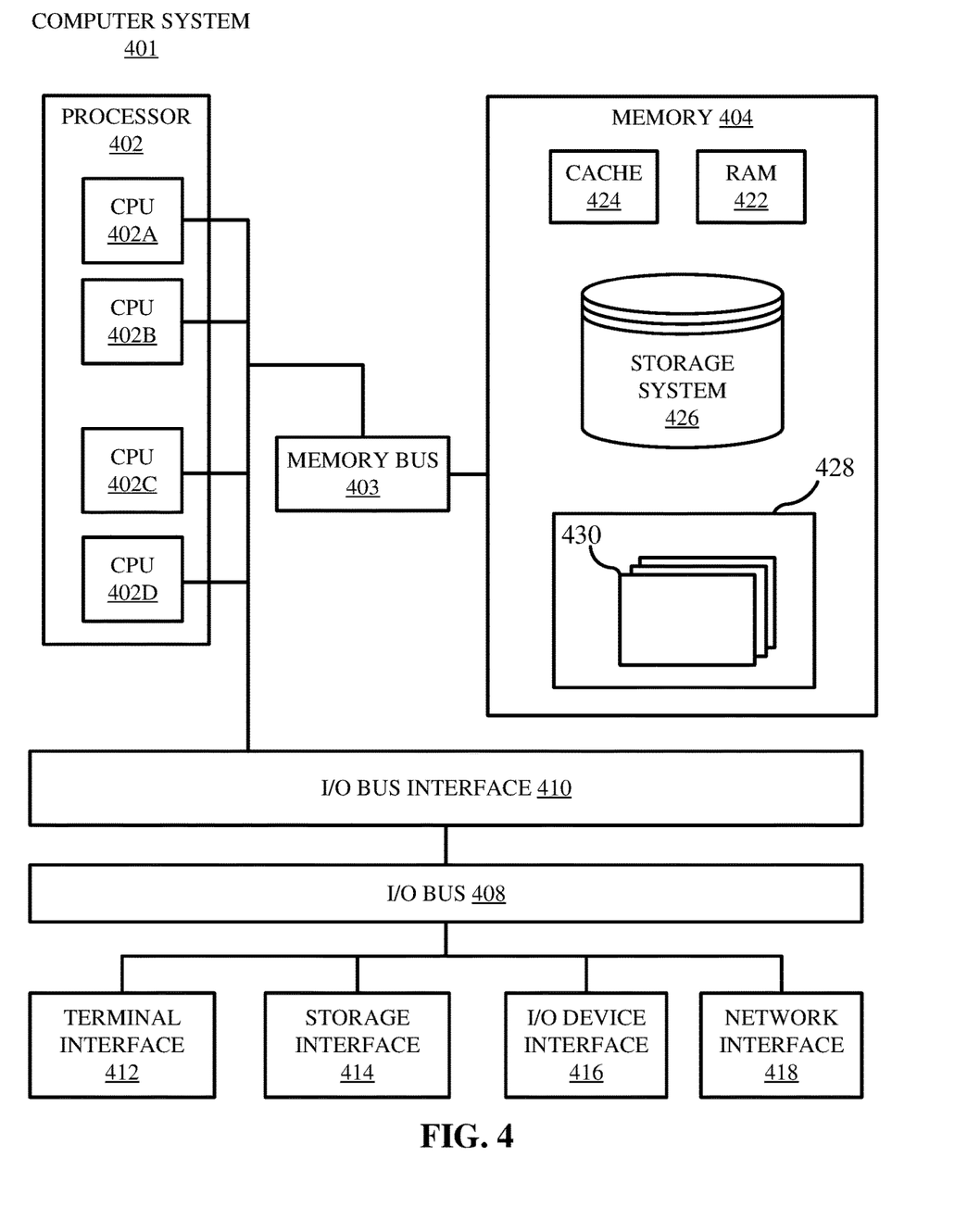
FIG. 4 is a high-level block diagram illustrating an example computer system that can be used in implementing one or more of the methods, tools, modules, and any related functions described herein, in accordance with embodiments of the present disclosure.

Referring now to FIG. 4, shown is a high-level block diagram of an example computer system 401 that may possibly be utilized in various devices discussed herein (e.g., devices 105, server 135, IoT devices 230, PPE management system 200, user device 255) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
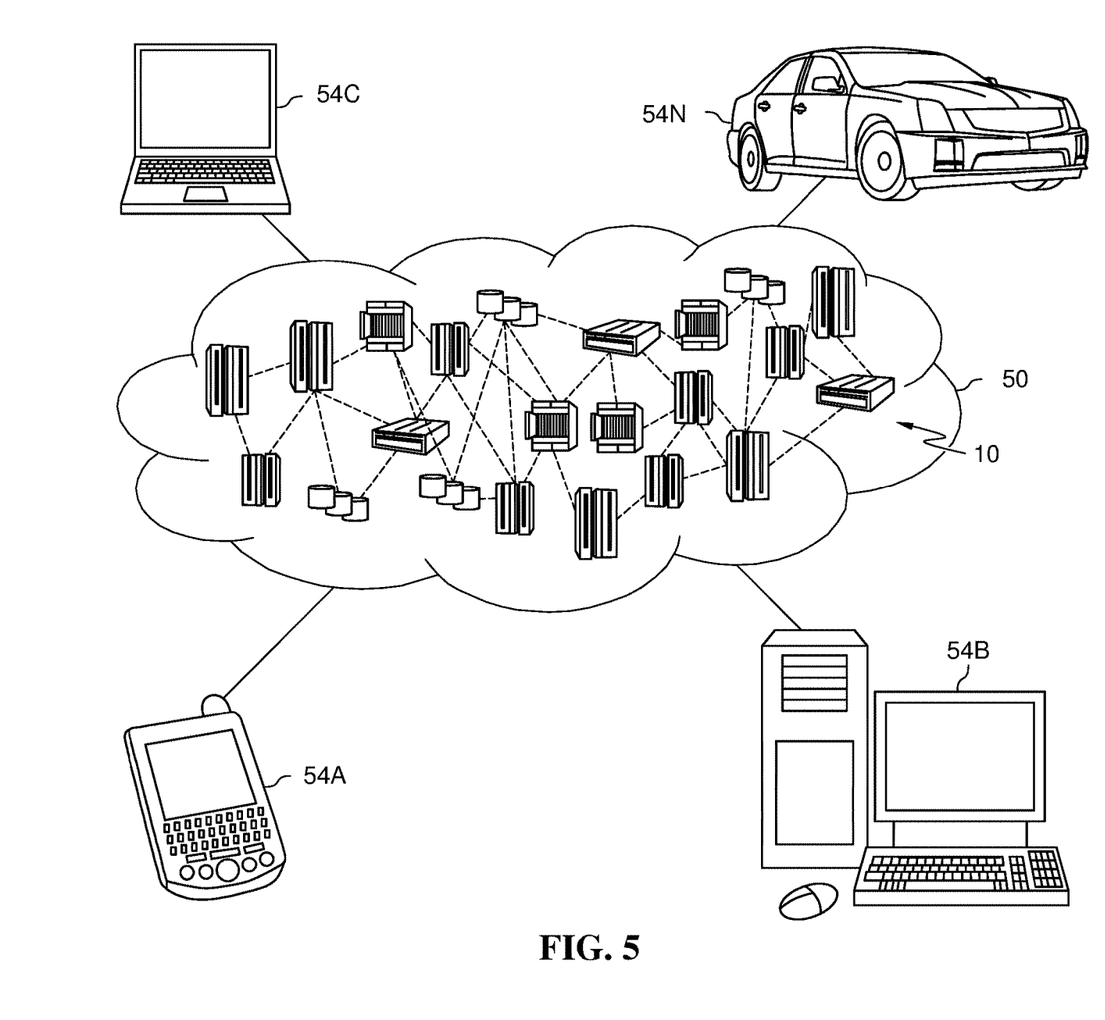
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
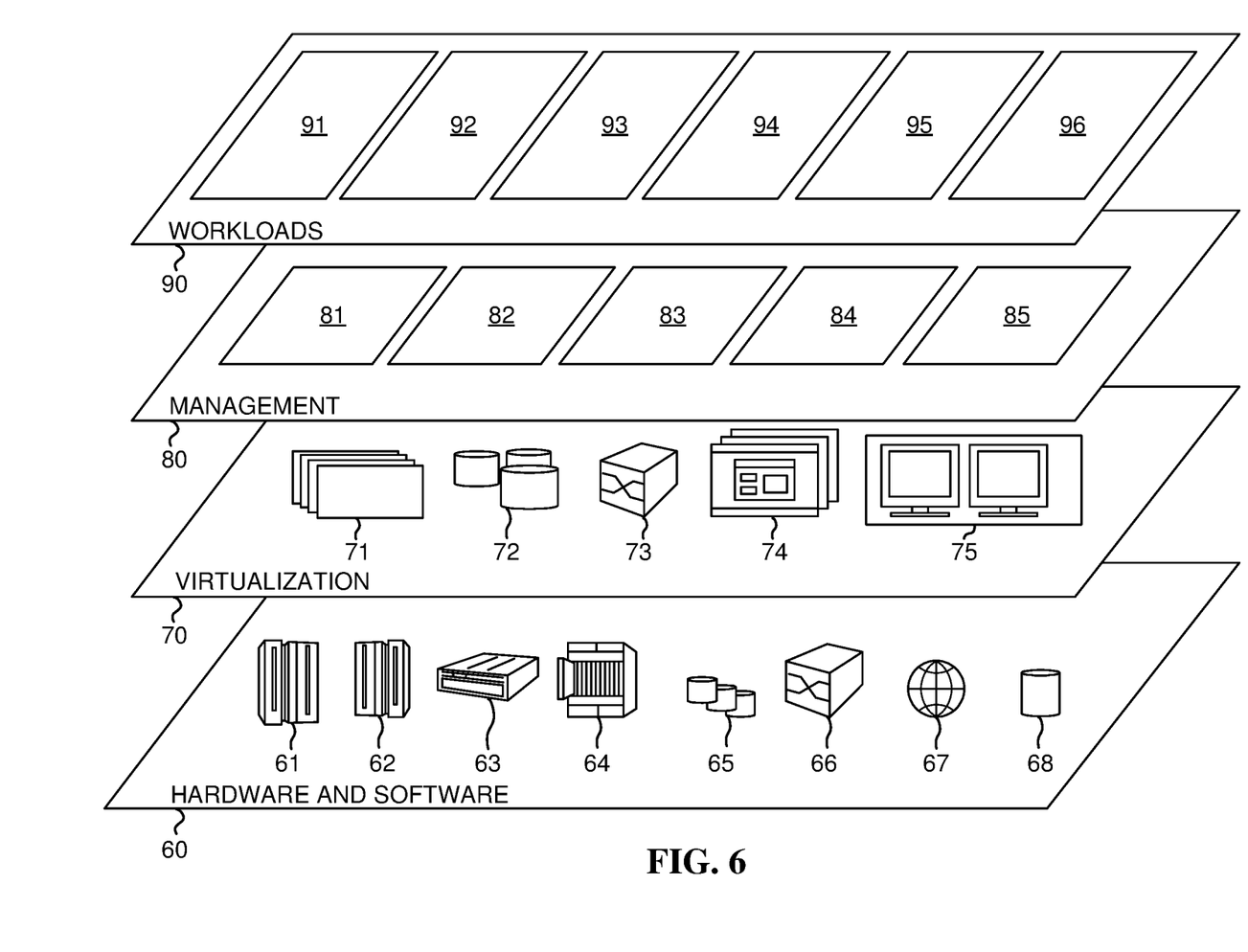
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personal protected equipment (PPE) management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
receiving a set of personal protective equipment (PPE) data describing use time limits of respective PPE articles of a set of PPE articles;
monitoring use of a PPE article of the set of PPE articles wherein the monitoring comprises:
determining a use time of the PPE article;
monitoring the use of the PPE article via a chemical sensor; and
monitoring the use of the PPE article via a camera to recognize objects within an environment of the PPE article;
determining whether a PPE usage rule of the PPE article is satisfied based on the monitoring, wherein the PPE usage rule is based on at least the determined use time as compared to a use time limit of the PPE article, a chemical sensor value collected by the chemical sensor as compared to a chemical value threshold, and based on whether a first object is recognized via the camera using object recognition;
issuing, in response to determining that the PPE usage rule of the PPE article is satisfied, a PPE recommendation action;
receiving, from a user of the PPE article, feedback regarding the user's satisfaction with the issued PPE recommendation action;
adjusting, using a reinforcement learning algorithm, based on the received feedback, the PPE usage rule; and
determining whether the adjusted PPE usage rule of the PPE article is satisfied based on additional monitoring.

2. The method of claim 1, wherein the PPE usage rule is further based on a plurality of weighted factors, wherein the use time is a first factor having a first weight, wherein the chemical sensor value collected by the chemical sensor is a second factor having a second weight, and wherein the recognized first object is a third factor having a third weight.

3. A system comprising:
one or more processors; and
one or more computer-readable storage media collectively storing program instructions which, when executed by the one or more processors, are configured to cause the one or more processors to perform a method comprising:
receiving a set of personal protective equipment (PPE) data describing use time limits of respective PPE articles of a set of PPE articles;
monitoring use of a PPE article of the set of PPE articles wherein the monitoring comprises:
determining a use time of the PPE article;
monitoring the use of the PPE article via a chemical sensor; and
monitoring the use of the PPE article via a camera to recognize objects within an environment of the PPE article;
determining whether a PPE usage rule of the PPE article is satisfied based on the monitoring, wherein the PPE usage rule is based on at least the determined use time as compared to a use time limit of the PPE article, a chemical sensor value collected by the chemical sensor as compared to a chemical value threshold, and based on whether a first object is recognized via the camera using object recognition;

issuing, in response to determining that the PPE usage rule of the PPE article is satisfied, a PPE recommendation action;

receiving, from a user of the PPE article, feedback regarding the user's satisfaction with the issued PPE recommendation action;

adjusting, using a reinforcement learning algorithm, based on the received feedback, the PPE usage rule; and determining whether the adjusted PPE usage rule of the PPE article is satisfied based on additional monitoring.

4. The system of claim 3, wherein the PPE usage rule is further based on a plurality of weighted factors, wherein the use time is a first factor having a first weight, wherein the chemical sensor value collected by the chemical sensor is a second factor having a second weight, and wherein the recognized first object is a third factor having a third weight.

5. A computer program product comprising one or more computer readable storage media, and program instructions collectively stored on the one or more computer readable storage media, the program instructions comprising instructions configured to cause one or more processors to perform a method comprising:

receiving a set of personal protective equipment (PPE) data describing use time limits of respective PPE articles of a set of PPE articles;

monitoring use of a PPE article of the set of PPE articles, wherein the monitoring comprises:
  determining a use time of the PPE article;
  monitoring the use of the PPE article via a chemical sensor; and
  monitoring the use of the PPE article via a camera to recognize objects within an environment of the PPE article;

determining whether a PPE usage rule of the PPE article is satisfied based on the monitoring, wherein the PPE usage rule is based on at least the determined use time as compared to a use time limit of the PPE article, a chemical sensor value collected by the chemical sensor as compared to a chemical value threshold, and based on whether a first object is recognized via the camera using object recognition;

issuing, in response to determining that the PPE usage rule of the PPE article is satisfied, a PPE recommendation action;

receiving, from a user of the PPE article, feedback regarding the user's satisfaction with the issued PPE recommendation action;

adjusting, using a reinforcement learning algorithm, based on the received feedback, the PPE usage rule; and determining whether the adjusted PPE usage rule of the PPE article is satisfied based on additional monitoring.

6. The computer program product of claim 5, wherein the PPE usage rule is further based on a plurality of weighted factors, wherein the use time is a first factor having a first weight, wherein the chemical sensor value collected by the chemical sensor is a second factor having a second weight, and wherein the recognized first object is a third factor having a third weight.

7. The method of claim 1, wherein the PPE recommendation action includes a recommendation to dispose the PPE article.

8. The method of claim 1, wherein the PPE recommendation action includes a recommendation to replace the PPE article.

9. The method of claim 1, wherein the PPE recommendation action includes a recommendation to disinfect the PPE article.

* * * * *